US012784265B2

(12) United States Patent
Atmeh

(10) Patent No.: US 12,784,265 B2
(45) Date of Patent: Nov. 3, 2026

(54) OBJECT RELEVANCE POTENTIAL FIELD FOR OPERATING VEHICLE

(71) Applicant: Ford Global Technologies, LLC, Dearborn, MI (US)

(72) Inventor: Ghassan Atmeh, L'Anse, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 165 days.

(21) Appl. No.: 18/743,293

(22) Filed: Jun. 14, 2024

(65) Prior Publication Data

US 2025/0384576 A1 Dec. 18, 2025

(51) Int. Cl.
*G06T 7/73* (2017.01)
*G06V 20/56* (2022.01)
*G06V 20/58* (2022.01)

(52) U.S. Cl.
CPC ................ *G06T 7/73* (2017.01); *G06V 20/58* (2022.01); *G06V 20/588* (2022.01); *G06T 2207/30256* (2013.01); *G06V 2201/07* (2022.01); *G06V 2201/08* (2022.01)

(58) Field of Classification Search
CPC . G06T 7/73; G06T 2207/30256; G06V 20/58; G06V 20/588; G06V 2201/07; G06V 2201/08
See application file for complete search history.

(56) References Cited

U.S. PATENT DOCUMENTS

| | | | | |
|---|---|---|---|---|
| 10,928,820 | B1 * | 2/2021 | Tao | B60W 50/0097 |
| 10,981,577 | B1 | 4/2021 | Hu | |
| 2018/0341822 | A1 | 11/2018 | Hovis et al. | |
| 2020/0231149 | A1 * | 7/2020 | Eggert | G08G 1/166 |
| 2023/0074387 | A1 * | 3/2023 | Goyal | G01C 21/3407 |
| 2023/0182782 | A1 | 6/2023 | Zhang et al. | |
| 2023/0294729 | A1 * | 9/2023 | Danziger | B60W 60/001 701/23 |
| 2024/0326792 | A1 * | 10/2024 | Puphal | B60W 10/00 |

FOREIGN PATENT DOCUMENTS

DE 102015223248 A1 5/2017

* cited by examiner

*Primary Examiner* — Ig T An

(74) *Attorney, Agent, or Firm* — Frank A. Mackenzie; Brooks Kushman P.C.

(57) ABSTRACT

A computer includes a processor and a memory, and the memory stores instructions executable by the processor to generate a potential field covering an environment surrounding an ego vehicle and centered on the ego vehicle, and determine a relevance score for an object in the environment according to a position of the object in the potential field. The potential field indicates relevance to the ego vehicle.

20 Claims, 7 Drawing Sheets

OBJECT RELEVANCE POTENTIAL FIELD FOR OPERATING VEHICLE

BACKGROUND

Advanced driver assistance systems (ADAS) are electronic technologies that assist drivers in driving and parking functions. Examples of ADAS include forward proximity detection, lane-departure detection, blind-spot detection, braking actuation, adaptive cruise control, and lane-keeping assistance systems. Some types of ADAS actuate components of the vehicle based on objects in the environment around the vehicle.

DETAILED DESCRIPTION

Figure 1:
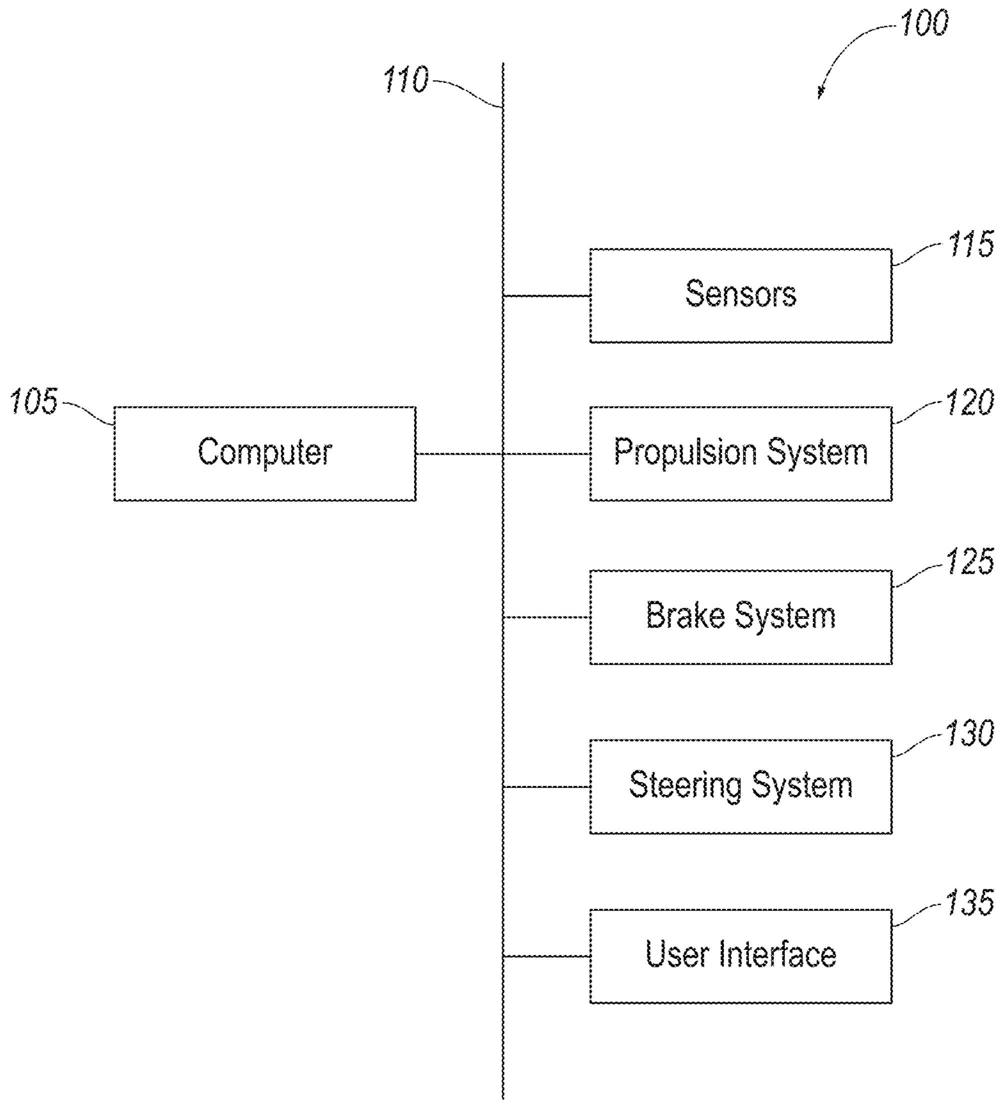
FIG. 1 is a block diagram of an example ego vehicle.

This disclosure describes techniques for evaluating the relevance to an ego vehicle of different objects in an environment surrounding the ego vehicle. The ego vehicle may use the relevance to prioritize the objects for the purpose of controlling the ego vehicle, e.g., to expend a greater proportion of finite computing resources evaluating objects that are more likely to affect operation of the ego vehicle. A computer of the ego vehicle is programmed to generate a potential field covering an environment surrounding the ego vehicle and centered on the ego vehicle, and determine a relevance score for an object in the environment according to a position of the object in the potential field. The potential field indicates relevance to the ego vehicle. The use of the potential field provides some computational advantages over other ways of assigning relevance to objects. Changes in the environment, e.g., as the ego vehicle travels, may be incorporated into the generation of the potential field, and would not need to be reevaluated for each object. Instead, the position or pose of the object may be plugged into the potential field to determine the relevance score, and other information besides the position or pose does not change from object to object. This quick determination means that relevance scores for objects can be determined on board the ego vehicle in real time as the ego vehicle travels through the environment.

A computer includes a processor and a memory, and the memory stores instructions executable by the processor to generate a potential field covering an environment surrounding an ego vehicle and centered on the ego vehicle, and determine a relevance score for an object in the environment according to a position of the object in the potential field. The potential field indicates relevance to the ego vehicle.

In an example, the instructions may further include instructions to operate the ego vehicle based on the relevance score.

In an example, the instructions may further include instructions to generate the potential field based on a speed at which the ego vehicle is traveling through the environment. In a further example, the instructions may further include instructions to determine a longitudinal reference distance extending longitudinally from the ego vehicle based on the speed, and generate the potential field based on the longitudinal reference distance.

In an example, the instructions may further include instructions to generate the potential field based on a layout of a road on which the ego vehicle is traveling. In a further example, the instructions may further include instructions to determine a lateral reference distance extending laterally from the ego vehicle based on the layout of the road, and generate the potential field based on the lateral reference distance. In a yet further example, the lateral reference distance may be a left lateral reference distance extending left from the ego vehicle, and the instructions may further include instructions to determine a right lateral reference distance extending laterally right from the ego vehicle based on the layout of the road, and generate the potential field based on the left lateral distance and the right lateral reference distance, the right lateral reference distance being different than the left lateral reference distance.

In another further example, the layout of the road may include a lane line of the road, and the instructions may further include instructions to generate the potential field based on the lane line.

In another further example, the layout of the road may include an upcoming intersection in a forward direction from the ego vehicle, and the instructions may further include instructions to generate the potential field based on the upcoming intersection.

In an example, the instructions may further include instructions to generate the potential field based on a position of a target vehicle. In a further example, the instructions may further include instructions to determine a longitudinal reference distance extending longitudinally from the ego vehicle based on the position of the target vehicle, and generate the potential field based on the longitudinal reference distance.

In another further example, the target vehicle may be a leading vehicle traveling ahead of the ego vehicle.

In an example, the potential field may be defined relative to a Frenet frame following a lane of travel of the ego vehicle.

In an example, the potential field may be continuously differentiable across the environment.

In an example, the instructions may further include instructions to determine the relevance score for the object based on a heading of the object. In a further example, the instructions may further include instructions to determine the relevance score based on an angle between the heading of the object and a gradient of the potential field at the position of the object.

A method includes generating a potential field covering an environment surrounding an ego vehicle and centered on the ego vehicle, and determining a relevance score for an object in the environment according to a position of the object in the potential field. The potential field indicates relevance to the ego vehicle.

In an example, the method may further include generating the potential field based on a speed at which the ego vehicle is traveling through the environment.

In an example, the method may further include generating the potential field based on a layout of a road on which the ego vehicle is traveling.

In an example, the method may further include generating the potential field based on a position of a target vehicle.

With reference to the Figures, wherein like numerals indicate like parts throughout the several views, a computer 105 includes a processor and a memory, and the memory stores instructions executable by the processor to generate a potential field 205 covering an environment 200 surrounding an ego vehicle 100 and centered on the ego vehicle 100, and determine a relevance score for an object 605 in the environment 200 according to a position of the object 605 in the potential field 205. The potential field 205 indicates relevance to the ego vehicle 100.

With reference to FIG. 1, the ego vehicle 100 may be any passenger or commercial automobile such as a car, a truck, a sport utility vehicle, a crossover, a van, a minivan, a taxi, a bus, etc. The ego vehicle 100 may include the computer 105, a communications network 110, sensors 115, a propulsion system 120, a brake system 125, a steering system 130, and a user interface 135.

The computer 105 is a microprocessor-based computing device, e.g., a generic computing device including a processor and a memory, an electronic controller or the like, a field-programmable gate array (FPGA), an application-specific integrated circuit (ASIC), a combination of the foregoing, etc. Typically, a hardware description language such as VHDL (VHSIC (Very High Speed Integrated Circuit) Hardware Description Language) is used in electronic design to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. The computer 105 can thus include a processor, a memory, etc. The memory of the computer 105 can include media for storing instructions executable by the processor as well as for electronically storing data and/or databases, and/or the computer 105 can include structures such as the foregoing by which programming is provided. The computer 105 can be multiple computers coupled together.

The computer 105 may transmit and receive data through the communications network 110. The communications network 110 may be, e.g., a controller area network (CAN) bus, Ethernet, WiFi, Local Interconnect Network (LIN), onboard diagnostics connector (OBD-II), and/or any other wired or wireless communications network. The computer 105 may be communicatively coupled to the sensors 115, the propulsion system 120, the brake system 125, the steering system 130, the user interface 135, and other components via the communications network 110.

The sensors 115 may provide data about operation of the ego vehicle 100, for example, wheel speed, wheel orientation, and engine and transmission data (e.g., temperature, fuel consumption, etc.). For example, the sensors 115 may include a speedometer. The speedometer may be any sensor suitable for measuring the speed of the ego vehicle 100, for example, as is known, a mechanical or eddy-current speedometer, or a vehicle speed sensor. A vehicle speed sensor may use a magnetic field detector to count interruptions of a magnetic field by a toothed metal disk disposed on a driveshaft of the ego vehicle 100. The sensors 115 may detect the location and/or orientation of the ego vehicle 100. For example, the sensors 115 may include global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. The sensors 115 may detect the external world, e.g., objects 605 and/or characteristics of surroundings of the ego vehicle 100, such as other vehicles, road lane markings, traffic lights and/or signs, road users, etc. For example, the sensors 115 may include radar sensors, ultrasonic sensors, scanning laser range finders, light detection and ranging (lidar) devices, and image processing sensors such as cameras.

The propulsion system 120 of the ego vehicle 100 generates energy and translates the energy into motion of the ego vehicle 100. The propulsion system 120 may be a conventional vehicle propulsion subsystem, for example, a conventional powertrain including an internal-combustion engine coupled to a transmission that transfers rotational motion to wheels; an electric powertrain including batteries, an electric motor, and a transmission that transfers rotational motion to the wheels; a hybrid powertrain including elements of the conventional powertrain and the electric powertrain; or any other type of propulsion. The propulsion system 120 can include an electronic control unit (ECU) or the like that is in communication with and receives input from the computer 105 and/or a human operator. The human operator may control the propulsion system 120 via, e.g., an accelerator pedal and/or a gear-shift lever.

The brake system 125 is typically a conventional vehicle braking subsystem and resists the motion of the ego vehicle 100 to thereby slow and/or stop the ego vehicle 100. The brake system 125 may include friction brakes such as disc brakes, drum brakes, band brakes, etc.; regenerative brakes; any other suitable type of brakes; or a combination. The brake system 125 can include an electronic control unit (ECU) or the like that is in communication with and receives input from the computer 105 and/or a human operator. The human operator may control the brake system 125 via, e.g., a brake pedal.

The steering system 130 is typically a conventional vehicle steering subsystem and controls the turning of the wheels. The steering system 130 may be a rack-and-pinion system with electric power-assisted steering, a steer-by-wire system, as both are known, or any other suitable system. The steering system 130 can include an electronic control unit (ECU) or the like that is in communication with and receives input from the computer 105 and/or a human operator. The human operator may control the steering system 130 via, e.g., a steering wheel.

The user interface 135 presents information to and receives information from an operator of the ego vehicle 100. The user interface 135 may be located, e.g., on an instrument panel in a passenger compartment of the ego vehicle 100, or wherever may be readily seen by the operator. The user interface 135 may include dials, digital readouts, screens, speakers, and so on for providing information to the operator, e.g., human-machine interface (HMI) elements such as are known. The user interface 135 may include buttons, knobs, keypads, microphone, and so on for receiving information from the operator.

Figure 2:
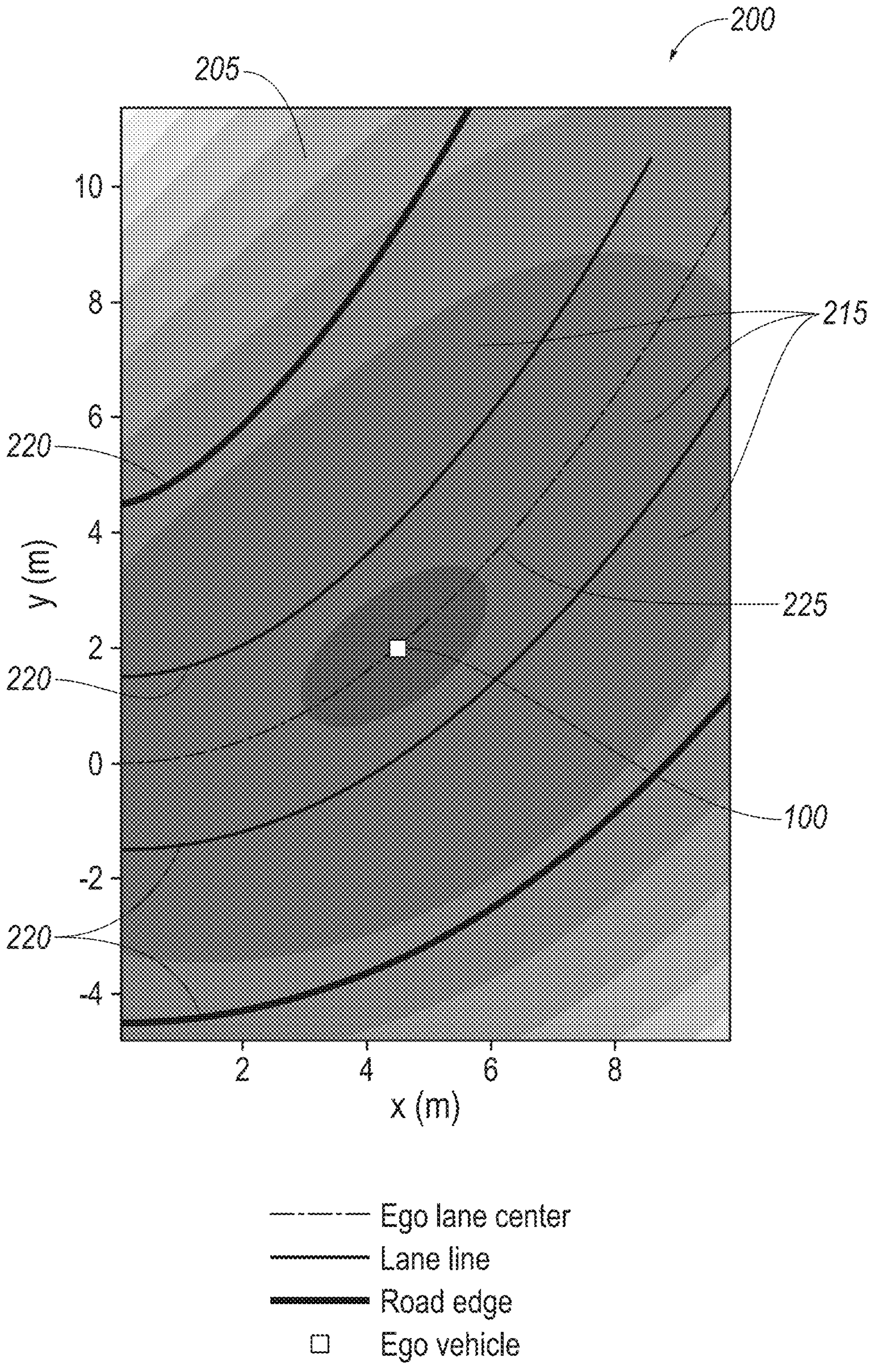
FIG. 2 is a top-view plot of an example potential field covering an environment through which the ego vehicle is traveling plotted in a Cartesian coordinate system.

With reference to FIG. 2, the ego vehicle 100 is traveling through an environment 200. The environment 200 is the geographic area in the vicinity of the ego vehicle 100, i.e., surrounding the ego vehicle 100. The environment 200 may include roads 210; stationary objects such as buildings, traffic controls, etc.; topographical features; etc. Position in the environment 200 is plotted in Cartesian coordinates in FIG. 2.

The environment 200 includes a plurality of roads 210. The roads 210 include a road 210 on which the ego vehicle 100 is traveling, as well as other roads 210, e.g., roads 210 intersecting the road 210 on which the ego vehicle 100 is traveling. The roads 210 have a layout. For the purposes of this disclosure, a "layout" of a road 210 is defined as an arrangement of the areas constituting the road 210. For example, the layout of the road 210 may include the positions and extent of lanes 215, lane lines 220, intersections 505, and so on.

The computer 105 may store map data describing the environment 200 in memory. The computer 105 may receive the map data from a remote server or may already have the map data prestored in the memory. The map data includes representations of the roads 210, e.g., the lanes 215 of the roads 210, as well as possibly other traffic control data, e.g., posted speed limits, stoplights, and other posted traffic instructions. The map data may define positions of the roads 210 and other items in a coordinate system, e.g., the Cartesian coordinate system shown in FIG. 2.

Figure 6:
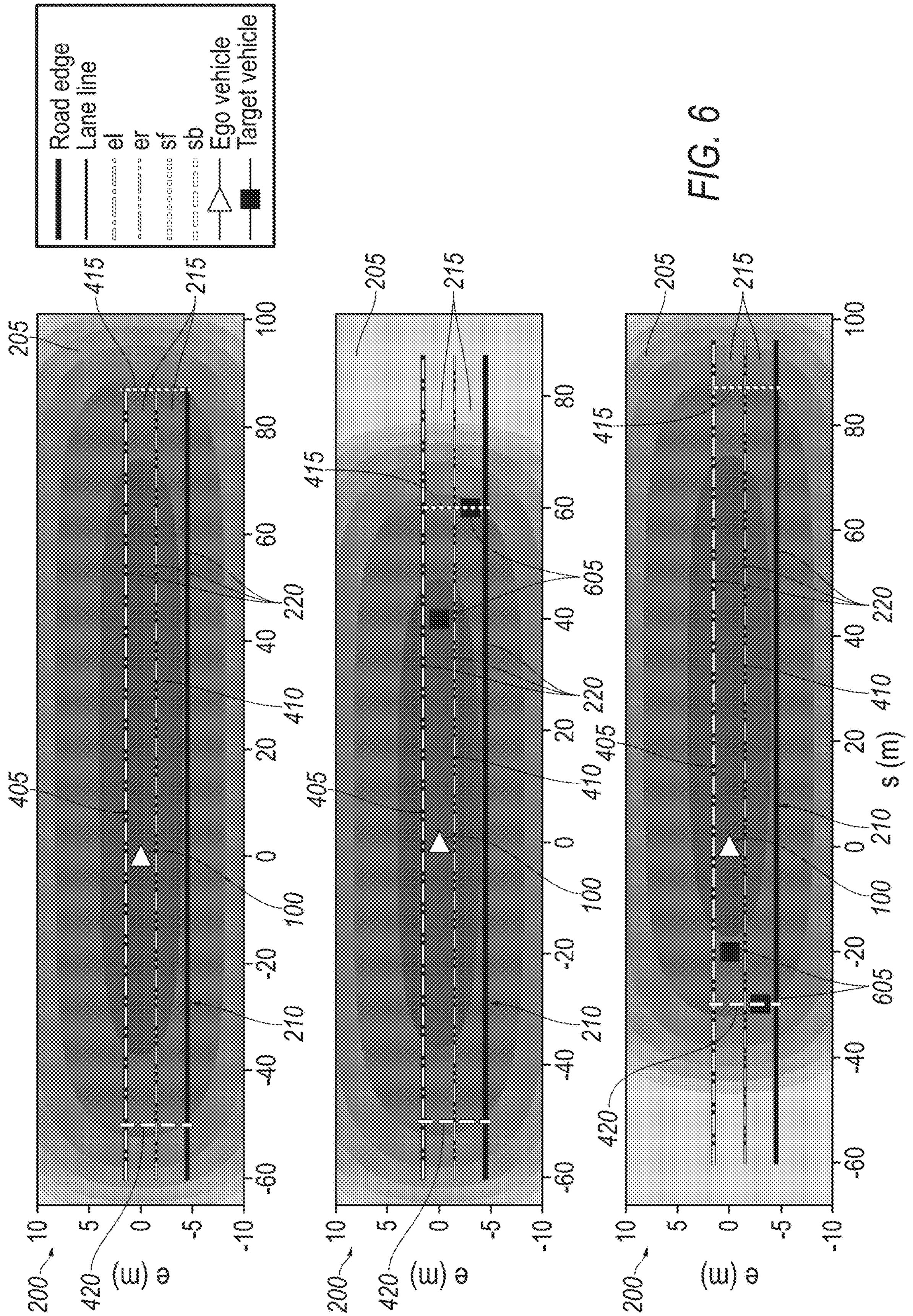
FIG. 6 is a series of plots of example potential fields covering target vehicles near the ego vehicle.

Other objects 605 besides the ego vehicle 100 may be traveling through the environment 200, as shown in FIG. 6. The objects 605 may include target vehicles as well as road users that are not vehicles. For the purposes of this disclosure, "ego vehicle" is defined as a vehicle under the control of the computer 105, and "target vehicle" is defined as a different vehicle than the ego vehicle 100.

The computer 105 may detect the objects 605 using sensor data received from the sensors 115. The sensor data may include image data from cameras; range data from radars, lidars, or ultrasonic sensors; etc. The image data are a sequence of image frames of the fields of view of the respective cameras. Each image frame is a two-dimensional matrix of pixels. Each pixel has a brightness or color represented as one or more numerical values, e.g., a scalar unitless value of photometric light intensity between 0 (black) and 1 (white), or values for each of red, green, and blue, e.g., each on an 8-bit scale (0 to 255) or a 12- or 16-bit scale. The range data may be, e.g., a point cloud. The points of the point cloud specify respective positions in the environment 200 relative to the position of the ranging sensor, e.g., the radar or lidar. For example, the range data can be in spherical coordinates with the ranging sensor at the origin of the spherical coordinate system. The spherical coordinates can include a radial distance, i.e., a measured depth from the ranging sensor to the point measured by the ranging sensor; a polar angle, i.e., an angle from a vertical axis through the ranging sensor to the point measured by the ranging sensor; and an azimuthal angle, i.e., an angle in a horizontal plane from a horizontal axis through the ranging sensor to the point measured by the ranging sensor.

The computer 105 may be programmed to detect the objects 605 based on the sensor data. For example, for the image data, the computer 105 may identify the objects 605 using conventional image-recognition techniques, e.g., a convolutional neural network programmed to accept images as input and output identified objects 605. A convolutional neural network includes a series of layers, with each layer using the previous layer as input. Each layer contains a plurality of neurons that receive as input data generated by a subset of the neurons of the previous layers and generate output that is sent to neurons in the next layer. Types of layers include convolutional layers, which compute a dot product of a weight and a small region of input data; pool layers, which perform a downsampling operation along spatial dimensions; and fully connected layers, which generate based on the output of all neurons of the previous layer.

The final layer of the convolutional neural network generates a score for each potential type for an object 605, and the final output is the type with the highest score. The computer 105 may use similar machine-learning techniques for the range data.

The computer 105 may perform sensor fusion of the image data and the range data. Sensor fusion is combining data from disparate sources together so that the resulting data has less uncertainty than if the data from each source were used individually, e.g., in creating a unified model of the environment 200 of the ego vehicle 100. The sensor fusion can be performed with one or more algorithms, e.g., Kalman filter, central limit theorem, Bayesian networks, Dempster-Shafer, convolutional neural networks, etc. As a result of the sensor fusion, the range data may be associated with the objects 605 identified from the image data.

The computer 105 may be programmed to determine a heading of an object 605. The heading of an object 605 is a forward direction relative to that object 605. The heading may be a direction in which the object 605 is currently traveling if the object 605 is moving. If the object 605 is stationary, the heading may be the direction in which the object 605 is oriented, e.g., whether a target vehicle is parked perpendicular or parallel to the road 210. For an example, the computer 105 may determine the heading of a moving object 605 by determining a direction defined by two or more positions of the object 605 over time, e.g., the direction of a vector starting from a previous position of the object 605 and pointing toward a current position of the object 605. The computer 105 may determine a heading of a stationary object 605 by performing, e.g., object recognition algorithms as are known.

Returning to FIG. 2, the computer 105 is programmed to generate a potential field 205 covering the environment 200 surrounding the ego vehicle 100. For the purposes of this disclosure, a "potential field" is a mathematical function taking a position in space as an argument and outputting a scalar quantity, i.e., the outputted scalar quantity is a function of the position in space. In this disclosure, the potential field 205 indicates relevance to the ego vehicle 100, and the outputted scalar quantity is referred to as a relevance potential. In other words, an object 605 at a position with a higher relevance potential may be treated as higher priority than an object 605 at a position with a lower relevance potential. In the Figures, a higher relevance potential is indicated by darker shading.

Figure 3:
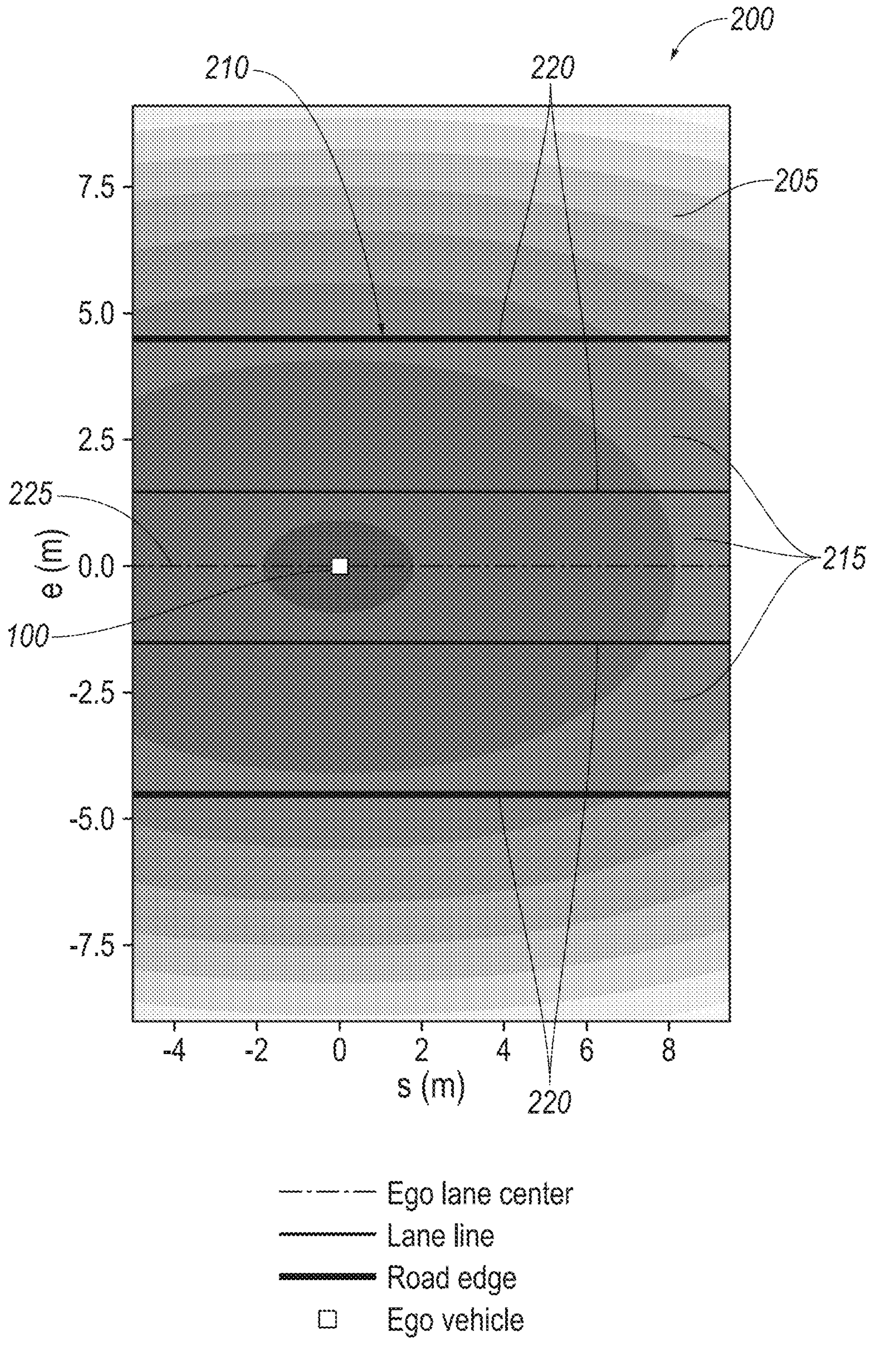
FIG. 3 is a plot of the potential field plotted in a Frenet frame.

With reference to FIG. 3, the potential field 205 is centered on the ego vehicle 100. For example, the position in the potential field 205 may be defined in a coordinate frame with the ego vehicle 100 at the origin of the coordinate frame, and the positions closest to the ego vehicle 100 may have the highest relevance potential. The potential field 205 may be defined relative to a Frenet frame following a lane 215 of travel of the ego vehicle 100. In general, a Frenet frame defines position in terms of a path length s along a curve and a distance e normal (i.e., perpendicular) to the curve (and, if three-dimensional, a second distance binormal to the curve). For this disclosure, the curve is a centerline 225 of the lane 215 of travel of the ego vehicle 100. The "lane of travel" for a vehicle is the lane 215 that the vehicle currently occupies. Positions in Cartesian coordinates or other coordinate systems may be converted into the Frenet frame by performing known transformations taking the curve as an input and the position in the original coordinate system as an input. The curve of the centerline 225 of the lane 215 of travel may be taken from the map data.

The potential field 205 may be a sum of multiple contributions to the relevance. For example, the potential field 205 may be a sum of a longitudinal contribution and a lateral contribution. The longitudinal contribution may be the contribution in the direction of travel of the ego vehicle 100, e.g., of the path length s along the centerline 225 of the lane 215 of travel. The lateral contribution may be the contribution of sideways distance relative to the ego vehicle 100, e.g., of the lateral distance e normal to the centerline 225 of the lane 215 of travel. For example, the potential field 205 may be defined by the following expression:

$$U(s, e) = U_{lat}(e) + U_{lon}(s)$$

in which U is the potential field 205, $U_{lat}$ is the lateral contribution, and $U_{lon}$ is the longitudinal contribution.

The lateral contribution $U_{lat}$ and longitudinal contribution $U_{lon}$ may each be single-variable functions, i.e., functions having a single variable as an argument. The lateral contribution $U_{lat}$ is a function of the lateral distance e but not the path length s, and the longitudinal contribution $U_{lon}$ is a function of the path length s but not the lateral distance e. Because the potential field 205 U is a sum of single-variable functions, the potential field 205 and its derivatives are simple to compute.

The lateral contribution $U_{lat}$ and longitudinal contribution $U_{lon}$ may each be analytical functions, i.e., mathematical expressions, as opposed to numerical functions (e.g., functions in the form of a lookup table). The use of analytical functions allows the contributions to be defined continuously throughout the environment 200, makes the functions smooth and differentiable, and can simplify computations. The contributions to the potential field 205, and thereby the potential field 205 itself, may be continuously differentiable across the environment 200. The form of the mathematical expression may be chosen to give a highest value at the origin, i.e., at the position of the ego vehicle 100. For example, the lateral contribution $U_{lat}$ and longitudinal contribution $U_{lon}$ may be exponential functions or polynomials. For example, the lateral contribution $U_{lat}$ may be given by the following exponential function:

$$U_{lat}(e) = K_l \exp(\alpha_l e - e_l) + K_r \exp(-\alpha_r e - e_r)$$

in which exp( ) is the exponential function, i.e., Euler's number e to the power of the argument, $K_l$ is a left gain constant, $\alpha_l$ is a left steepness constant, $e_r$ is a left lateral reference distance 405, $K_r$ is a right gain constant, $\alpha_r$ is a right steepness constant, and $e_r$ is a right lateral reference distance 410. The constants $K_l$, $\alpha_l$, $K_r$, $\alpha_r$ may be chosen according to the relative relevance of different surrounding areas to the ego vehicle 100, e.g., the right side versus the left side and the change with lateral distance on each side. The lateral reference distances 405, 410 $e_l$, $e_r$ may be determined as described below. Similarly, the longitudinal contribution $U_{lon}$ may be given by the following exponential function:

$$U_{lon}(s) = K_f \exp(\alpha_f s - s_f) + K_b \exp(-\alpha_b s - s_b)$$

in which $K_f$ is a front gain constant, $\alpha_f$ is a front steepness constant, $s_f$ is a front longitudinal reference distance 415, $K_b$ is a rear gain constant, $\pi_b$ is a rear steepness constant, and $s_b$ is a rear longitudinal reference distance 420. The constants $K_f$, $\alpha_f$, $K_b$, $\alpha_b$ may be chosen according to the relative relevance of different surrounding areas to the ego vehicle 100, e.g., the front direction versus the rear direction and the change with longitudinal distance in each direction. The longitudinal reference distances 415, 420 $s_f$, $s_b$ may be determined as described below.

Figure 4:
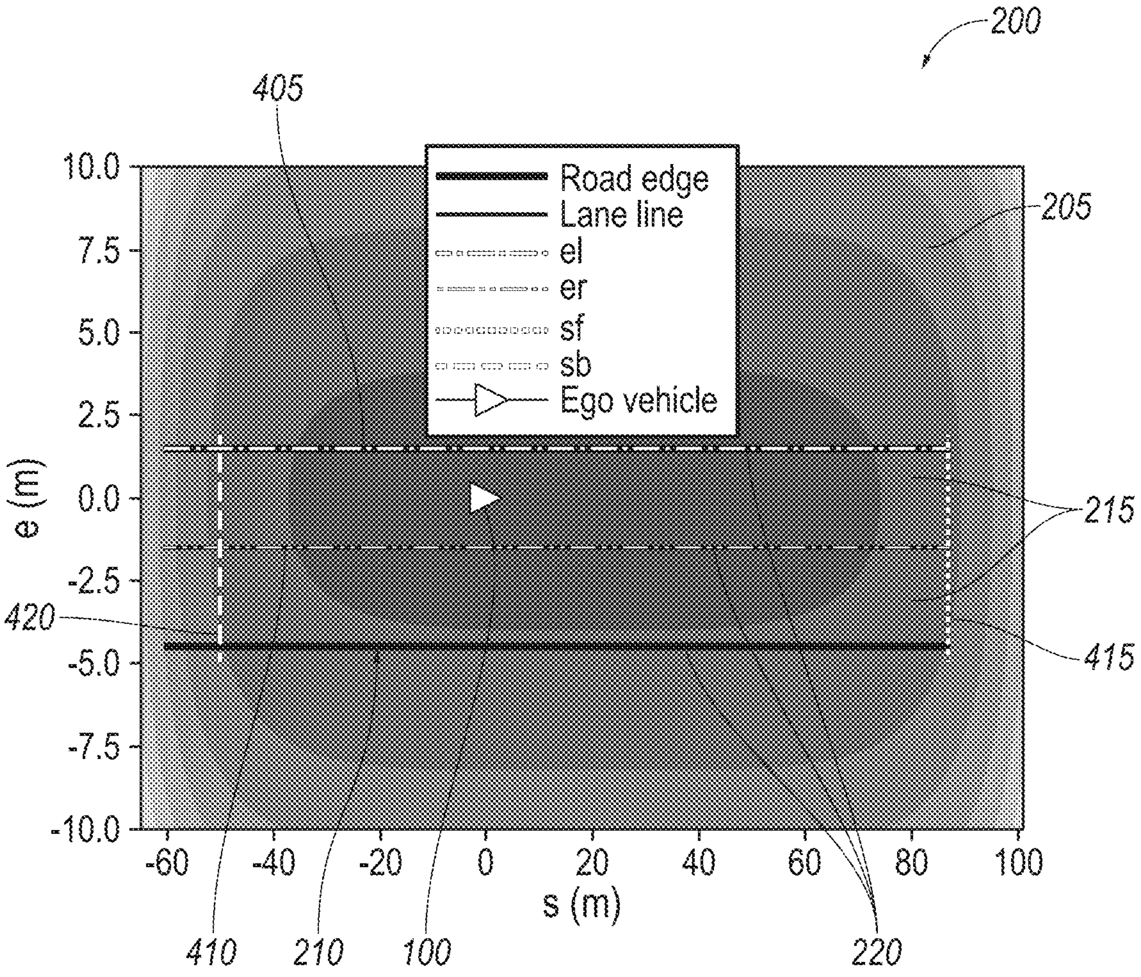
FIG. 4 is a plot of an example potential field with reference distances from the ego vehicle.

With reference to FIG. 4, the computer 105 is programmed to generate the potential field 205 based on the lateral and longitudinal reference distances 405, 410, 415, 420 $e_l$, $e_r$, $s_f$, $s_b$. For example, the reference distances 405, 410, 415, 420 $e_l$, $e_r$, $s_f$, $s_b$ are parameters defining the contributions to the potential field 205, as just described. The left lateral reference distance 405 $e_l$ extends left from the ego vehicle 100, the right lateral reference distance 410 $e_r$ extends right from the ego vehicle 100, the front longitudinal reference distance 415 $s_f$ extends forward from the ego vehicle 100, and the rear longitudinal reference distance 420 $s_b$ extends rearward from the ego vehicle 100.

The reference distances 405, 410, 415, 420 may be different from one another, e.g., the left lateral reference distance 405 $e_l$ may be different than the right lateral reference distance 410 $e_r$, and the front longitudinal reference distance 415 $s_f$ may be different than the rear longitudinal reference distance 420 $s_b$. The difference permits customization in how different areas of the environment 200 are prioritized.

The computer 105 may be programmed to determine the reference distances 405, 410, 415, 420 $e_l$, $e_r$, $s_f$, $s_b$, as will be described below. As different factors change, the reference distances 405, 410, 415, 420 $e_l$, $e_r$, $s_f$, $s_b$ correspondingly change. An increase in one of reference distances 405, 410, 415, 420 $e_l$, $e_r$, $s_f$, $s_b$ results in an increase in the relevance potential in the direction of that reference distance $e_l$, $e_r$, $s_f$, $s_b$ from the ego vehicle 100. For example, an increase in the forward longitudinal reference distance $s_f$ results in higher relevance potentials in front of the ego vehicle 100, or, equivalently, the position of a particular value of relevance potential moving farther forward from the ego vehicle 100, as shown in the top panel of FIG. 6 versus the middle panel of FIG. 6. The computer 105 may determine the reference distances 405, 410, 415, 420 $e_l$, $e_r$, $s_f$, $s_b$ based on factors such as a speed at which the ego vehicle 100 is traveling through the environment 200, a layout of the road 210 on which the ego vehicle 100 is traveling, and a position of the target vehicle, as will be described in turn.

The computer 105 may be programmed to generate the potential field 205 based on a speed at which the ego vehicle 100 is traveling through the environment 200. For example, the computer 105 may determine the front and/or rear longitudinal reference distance 415, 420 $s_f$, $s_b$ based on the speed, and then generate the potential field 205 based on the front and/or rear longitudinal reference distance 415, 420 $s_f$, $s_b$, as described above.

For example, the computer 105 may determine the forward longitudinal reference distance $s_f$ according to a formula including a linear increase with the speed, representing a constant time value for a lookahead distance. The formula may also provide a minimum value for the forward longitudinal reference distance $s_f$, as given in the following equation:

$$s_f = \max(t_{f,look}\|\vec{v}_{ego}\|, s_{f,min})$$

in which max( ) is a function returning the maximum of its arguments, $t_{f,look}$ is a preset time for the lookahead distance, $\|\vec{v}_{ego}\|$ is the speed of the ego vehicle 100, and $s_{f,min}$ is the minimum value for the forward longitudinal reference distance $s_f$. The time $t_{f,look}$ and the minimum value $s_{f,min}$ may be constant values chosen to represent areas of higher priority around the ego vehicle 100, e.g., 3 seconds for the time $t_{f,look}$ and 50 meters for the minimum value $s_{f,min}$. The speed $\|\vec{v}_{ego}\|$ is a magnitude of a velocity vector of the ego vehicle 100 and may be detected by a speedometer of the sensors 115.

Similarly, the computer 105 may determine the rear longitudinal reference distance 420 $s_b$ according to a formula including a linear decrease with the speed, and the formula may also provide a minimum value for the rear longitudinal reference distance 420 $s_b$, as given in the following equation:

$$s_b = \max(s_{b,max} - t_{b,look}\|\vec{v}_{ego}\|, s_{b,min})$$

in which $s_{b,max}$ is a maximum value for the rear longitudinal reference distance 420 $s_b$, $t_{b,look}$ is a rate of decrease with respect to the speed, and $s_{b,min}$ is the minimum value for the rear longitudinal reference distance 420 $s_b$. The maximum value $s_{b,max}$, the rate $t_{b,look}$, and the minimum value $s_{b,min}$ may be constant values chosen to represent areas of higher priority around the ego vehicle 100, e.g., 100 meters for the maximum value $s_{b,max}$, 3 seconds for the rate $t_{b,look}$, and 50 meters for the minimum value $s_{b,min}$.

Figure 5:
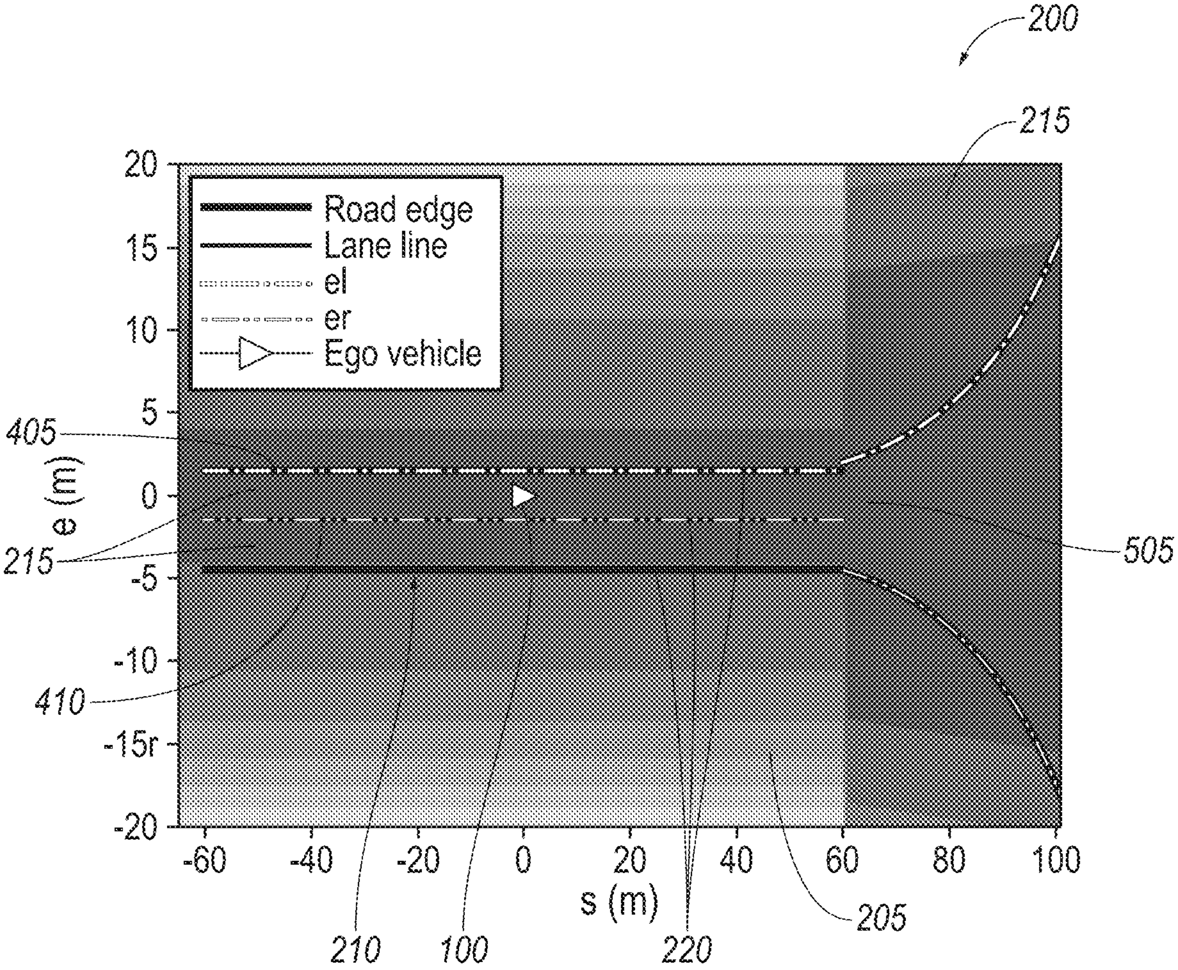
FIG. 5 is a plot of an example potential field covering an example road layout with an upcoming intersection.

With reference to FIG. 5, the computer 105 may be programmed to generate the potential field 205 based on a layout of a road 210 on which the ego vehicle 100 is traveling, e.g., based on the lane lines 220 or an upcoming intersection 505. For example, the computer 105 may determine the left and/or right lateral reference distance 405, 410 $e_l$, $e_r$ based on the layout of the road 210, and then generate the potential field 205 based on the left and/or right lateral reference distance 405, 410 $e_l$, $e_r$, as described above.

For example, the computer 105 may determine the left and/or right lateral reference distance 405, 410 $e_l$, $e_r$ based on the lane lines 220 of the road 210. The computer 105 may set the left lateral reference distance 405 $e_l$ equal to the distance to the farther lane line 220 of a neighboring lane 215 that is to the left of the ego vehicle 100 and adjacent to the lane 215 of travel of the ego vehicle 100. In the absence of a neighboring lane 215 to the left of the lane 215 of travel, the computer 105 may set the left lateral reference distance 405 $e_l$ equal to distance to the left lane line 220 of the lane 215 of travel. Similarly, the computer 105 may set the right lateral reference distance 410 $e_r$ equal to the distance to the farther lane line 220 of a neighboring lane 215 that is to the right of the ego vehicle 100 and adjacent to the lane 215 of travel of the ego vehicle 100. In the absence of a neighboring lane 215 to the right of the lane 215 of travel, the computer 105 may set the right lateral reference distance 410 $e_r$ equal to distance to the right lane line 220 of the lane 215 of travel.

For another example, the computer 105 may determine the left and/or right lateral reference distance 405, 410 $e_l$, $e_r$ based on an upcoming intersection 505 in a forward direction from the ego vehicle 100. The computer 105 may vary the left and/or right lateral reference distance 405, 410 $e_l$, $e_r$ as a function of the path length s. The computer 105 may set the left and/or right lateral reference distance 405, 410 $e_l$, $e_r$ equal to the distance to the lane line 220 of interest for sections of the path length s that do not pass through an upcoming intersection 505 (as just described), and the computer 105 may set the left and/or right lateral reference distance 405, 410 $e_l$, $e_r$ equal to a preset intersection distance for sections of the path length s that pass through an upcoming intersection 505. As an example, if the lane 215 of travel of the ego vehicle 100 passes through an intersection 505 between path length $s_1$ and $s_2$, then the left lateral reference distance 405 $e_l$ may be given by the following expression:

$$e_l(s) = \begin{cases} e_{l,lane} & s < s_1 \\ e_X & s_1 < s < s_2 \\ e_{l,lane} & s > s_2 \end{cases}$$

in which $e_{l,lane}$ is the distance to the lane line 220 of the left neighboring lane 215 or lane 215 of travel (as applicable), and $e_x$ is the preset intersection distance. The preset intersection distance $e_x$ is greater than the lateral lane-line distance $e_l$,lane. The preset intersection distance $e_x$ may be chosen to encompass objects 605 that may arrive at an intersection 505 contemporaneously with the ego vehicle 100.

With reference to FIG. 6, the computer 105 may be programmed to generate the potential field 205 based on a position of a target vehicle. For example, the computer 105 may determine the forward and/or rear longitudinal reference distance 415, 420 $s_f$, $s_b$ based on a position of a target vehicle, and then generate the potential field 205 based on the forward and/or rear longitudinal reference distance 415, 420 $s_f$, $s_b$, as described above.

For example, the computer 105 may select a target vehicle at a specific position forward of the ego vehicle 100 and set the forward longitudinal reference distance $s_f$ relative to the position of the selected target vehicle, e.g., at the position of the selected target vehicle or at a preset distance ahead of the selected target vehicle. The specific position may be defined by lane 215 of travel and order within the lane 215 of travel. For example, the specific position may be directly ahead of the ego vehicle 100; in other words, the computer 105 may select the target vehicle in the lane 215 of travel that is directly ahead of the ego vehicle 100. Alternatively, the specific position may be directly ahead of the target vehicle that is directly ahead of the ego vehicle 100, i.e., the second target vehicle ahead of the ego vehicle 100, as shown in the middle panel of FIG. 6. Alternatively, the specific position may be the farthest forward vehicle from among the target vehicles directly ahead of the ego vehicle 100 in the lane 215 of travel and the lanes 215 adjacent to the lane 215 of travel, i.e., the farthest forward from among the target vehicle in the lane 215 of travel, the target vehicle in the left neighboring lane 215, and the target vehicle in the right neighboring lane 215. Once the computer 105 selects the target vehicle, the computer 105 may set the forward longitudinal reference distance $s_f$ relative to the position of the selected target vehicle, e.g., at a preset distance ahead of the selected target vehicle, as in the following equation:

$$s_f = s_{target} + s_{f,buffer}$$

in which $s_{target}$ is the longitudinal distance to the selected target vehicle and $s_{f,buffer}$ is the preset distance. The preset distance $s_{f,buffer}$ may be chosen to encompass objects 605 that may soon interact with the ego vehicle 100.

Similarly, the computer 105 may select a target vehicle at a specific position rearward of the ego vehicle 100 and set the rear longitudinal reference distance 420 $s_b$ relative to the position of the selected target vehicle, e.g., at the position of the selected target vehicle or at a preset distance behind the selected target vehicle. The specific position may be defined by lane 215 of travel and order within the lane 215 of travel. For example, the specific position may be directly behind the ego vehicle 100; in other words, the computer 105 may select the target vehicle in the lane 215 of travel that is directly behind the ego vehicle 100. Alternatively, the specific position may be directly behind the target vehicle that is directly behind the ego vehicle 100, i.e., the second target vehicle behind the ego vehicle 100, as shown in the bottom panel of FIG. 6. Alternatively, the specific position may be the farthest rearward vehicle from among the target vehicles directly behind the ego vehicle 100 in the lane 215 of travel and the lanes 215 adjacent to the lane 215 of travel, i.e., the farthest rearward from among the target vehicle in the lane 215 of travel, the target vehicle in the left neighboring lane 215, and the target vehicle in the right neighboring lane 215. Once the computer 105 selects the target vehicle, the computer 105 may set the rear longitudinal reference distance 420 $s_b$ relative to the position of the selected target vehicle, e.g., at a preset distance behind the selected target vehicle, as in the following equation:

$$s_b = s_{target} + s_{b,buffer}$$

in which $s_{target}$ is the distance to the selected target vehicle and $s_{b,buffer}$ is the preset distance. The preset distance $s_{b,buffer}$ may be chosen to encompass objects 605 that may soon interact with the ego vehicle 100.

The computer 105 may be programmed to select from different techniques for determining one of the reference distances 405, 410, 415, 420 $e_l$, $e_r$, $s_f$, $s_b$, e.g., in situations in which more than one technique is available. For example, the forward and rear longitudinal reference distances 415, 420 $s_f$, $s_b$ may each be determined based on the speed of the ego vehicle 100 or based on the position of a target vehicle. The computer 105 may select the technique that outputs the greater value for the forward or rear longitudinal reference distance 415, 420 $s_f$, $s_b$. Alternatively, the computer 105 may apply a preset rule, e.g., determine the forward or rear longitudinal reference distance 415, 420 $s_f$, $s_b$ based on the position of the target vehicle in response to a target vehicle being present in the specified position, and determine the forward or rear longitudinal reference distance 415, 420 $s_f$, $s_b$ based on the speed of the ego vehicle 100 in the absence of a target vehicle in the specified position.

The computer 105 is programmed to determine a relevance score for an object 605 according to a position of the object 605 in the potential field 205. For example, the computer 105 may input the position (s, e) of the object 605 into the potential field 205 U(s, e), resulting in the relevance potential for the object 605, and calculate the relevance score using a formula that includes the relevance potential. The computer 105 may determine the relevance score based further on a heading of the object 605, e.g., based on an angle between the heading of the object 605 and a gradient of the potential field 205 at the position of the object 605. The relevance score may be a sum of the relevance potential and a term including the heading, e.g., a term including the angle between the heading of the object 605 and the gradient of the potential field 205, as in the following expression:

$$R(s, e, \vec{v}_{target}) = U(s, e) + \kappa \frac{\nabla U(s, e) \cdot \vec{v}_{target}}{\|\nabla U(s, e)\| \, \|\vec{v}_{target}\|} \|\vec{v}_{target}\|$$

in which R is the relevance score, $\vec{v}_{target}$ is the velocity vector of the object 605, $\kappa$ is a scaling factor, and $\nabla$ is the gradient operator. The scaling factor $\kappa$ may be chosen to ensure that the velocity term does not dominate the relevance score at highway speeds. The scaling factor $\kappa$ is between 0 and 1. An equivalent expression is the following:

$$R(s, e, \vec{v}_{target}) = U(s, e) + \kappa \cos(\theta) \|\vec{v}_{target}\|$$

in which $\theta$ is the angle between the gradient of the potential field 205 and the heading of the object 605, i.e., the direction of the velocity vector $\vec{v}_{target}$. For a stationary object 605, the following expression may instead be used:

$$R(s, e, \vec{v}_{target}) = U(s, e) + \kappa \cos(\theta)$$

The computer 105 may be programmed to determine relevance scores for multiple respective objects 605 at a single timestep, according to the respective positions. The computer 105 may determine the relevance score for each object 605 as just described. The computer 105 uses the same potential field 205 for each object 605, inputting each respective position for each respective object 605. The relevance scores thus allow comparisons of the relative relevance of multiple objects 605 around the ego vehicle 100.

The computer 105 may be programmed to determine a confidence measure for the relevance score for an object 605. The confidence measure may be a confidence interval or a variability metric such as variance or standard deviation. For example, the computer 105 may determine a confidence interval by determining a spread of positions for the object 605, e.g., a closer position and a farther position, and then determining relevance scores for the object 605 at the ends of the spread of positions, e.g., a relevance score for the closer position and a relevance score for the farther position. The spread of positions may be based on known uncertainty or noise in data from the sensors 115 or the process for sensor fusion. The computer 105 may substitute the relevance scores for the spread, e.g., the relevance score for the closer position of the object 605, in uses for the relevance score described below, e.g., in order to make the determinations more conservative.

The computer 105 may be programmed to downselect the objects 605, i.e., reduce the number of objects 605 under consideration, based on the relevance scores. For the purposes of this disclosure, downselecting is defined as selecting a subset of items from a typically larger set of items. For example, the computer 105 can select a preset number of the objects 605 having the greatest relevance scores, e.g., the objects 605 with the top five relevance scores. For another example, the computer 105 can select the objects 605 having relevance scores above a predetermined threshold. The threshold can be chosen to encompass objects 605 that may soon interact with the ego vehicle 100. Downselection can save processing time for the computer 105 when combined with actuating the ego vehicle 100 based on the objects 605 by capping the number of operations performed by the computer 105.

The computer 105 may be programmed to operate the ego vehicle 100 based on the relevance score. The computer 105 may actuate a component of the ego vehicle 100 based on the relevance scores. For example, the computer 105 may actuate one or more of the propulsion system 120, brake system 125, steering system 130, or user interface 135. For example, the computer 105 may actuate the component in executing an advanced driver assistance system (ADAS). ADAS are electronic technologies that assist drivers in driving and parking functions. Examples of ADAS include forward proximity detection, lane-departure detection, blind-spot detection, braking actuation, adaptive cruise control, and lane-keeping assistance systems. The computer 105 may actuate the brake system 125 to stop the ego vehicle 100 before reaching one of the objects 605 downselected according to the relevance scores, according to an assistive braking algorithm. The computer 105 may actuate the user interface 135 to output a message to the operator notifying them of the objects 605 downselected according to the relevance scores, according to a forward proximity detection algorithm. The computer 105 may operate the ego vehicle 100 autonomously, i.e., actuating the propulsion system 120, the brake system 125, and the steering system 130 based on the objects 605 downselected according to the relevance scores. The computer 105 may execute a path-planning algorithm to navigate the ego vehicle 100 around the objects 605 downselected according to the relevance scores.

Figure 7:
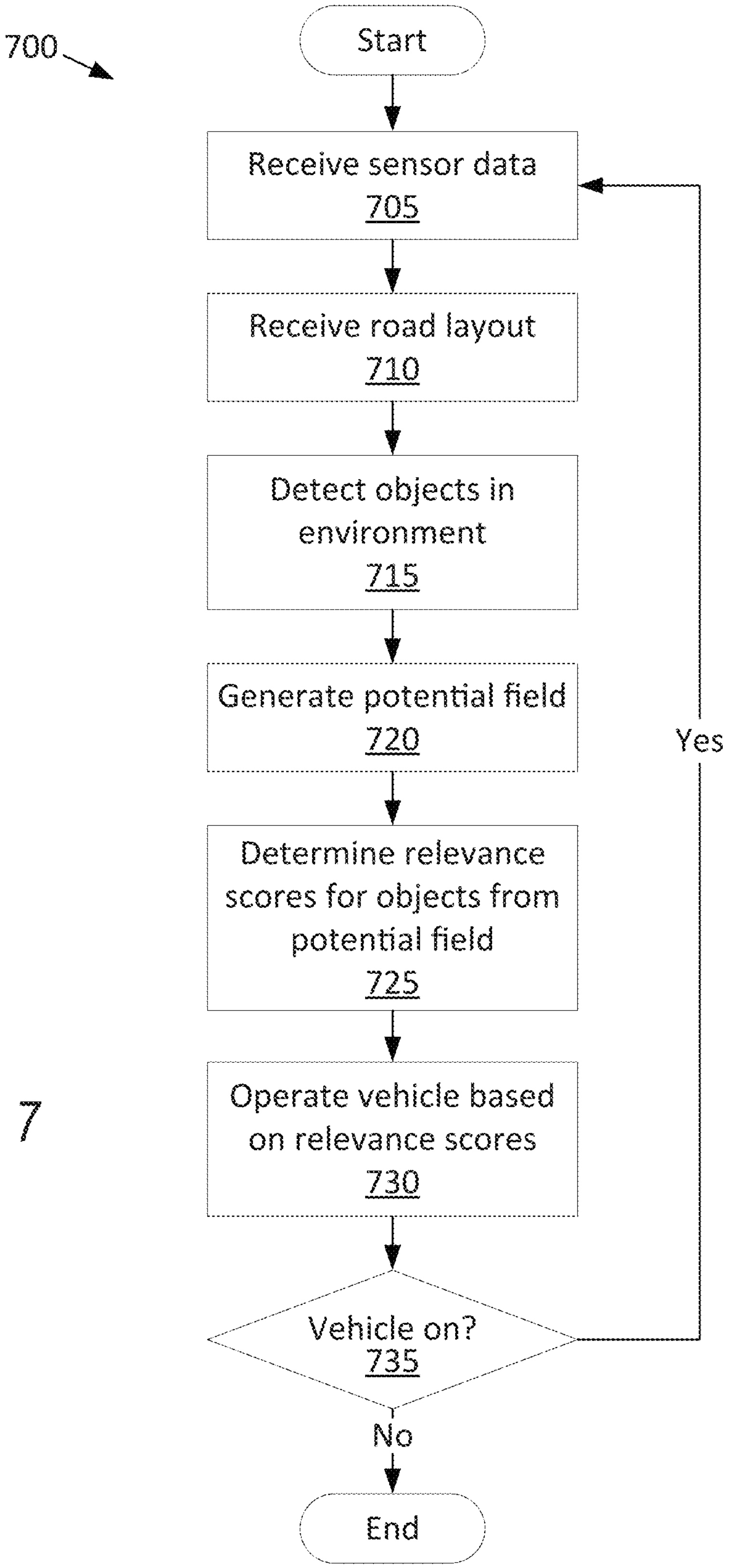
FIG. 7 is a flowchart of an example process for operating the ego vehicle based on the potential field.

FIG. 7 is a flowchart illustrating an example process 700 for operating the ego vehicle 100 based on the potential field 205. The memory of the computer 105 stores executable instructions for performing the steps of the process 700 and/or programming can be implemented in structures such as mentioned above. The process 700 may begin when the ego vehicle 100 is turned on. As a general overview of the process 700, the computer 105 receives sensor data from the sensors 115, receives map data indicating the layout of the roads 210, detects the objects 605, generates the potential field 205, determines the relevance scores for the objects 605, and operates the ego vehicle 100 based on the relevance scores. The process 700 continues for as long as the ego vehicle 100 remains on.

The process 700 begins in a block 705, in which the computer 105 receives sensor data from the sensors 115, as described above.

Next, in a block 710, the computer 105 receives the map data indicating the layout of the roads 210, as described above.

Next, in a block 715, the computer 105 detects the objects 605 based on the sensor data received in the block 705, as described above.

Next, in a block 720, the computer 105 generates the potential field 205 covering the environment 200, e.g., based on the sensor data from the block 705, the layout of the roads 210 from the block 710, and/or the target vehicles among the objects 605 detected in the block 715, as described above.

Next, in a block 725, the computer 105 determines the relevance scores based on the potential field 205 from the block 720, as described above.

Next, in a block 730, the computer 105 operates the ego vehicle 100 based on the relevance scores from the block 725, as described above.

Next, in a decision block 735, the computer 105 determines whether the ego vehicle 100 is still on. For the purposes of this disclosure, "on state" is defined as the state of the ego vehicle 100 in which full electrical energy is provided to electrical components of the ego vehicle 100 and the ego vehicle 100 is ready to be driven, e.g., the engine is running; "off state" is defined as the state of the ego vehicle 100 in which a low amount of electrical energy is provided to selected electrical components of the ego vehicle 100, typically used when the ego vehicle 100 is being stored; and "accessory-power state" is defined as the state of the ego vehicle 100 in which full electrical energy is provided to more electrical components than in the off state and the ego vehicle 100 is not ready to be driven. Typically, an operator puts the ego vehicle 100 into the on state when the occupant is going to drive the ego vehicle 100, puts the ego vehicle 100 into the off state when the operator is going to leave the ego vehicle 100, and puts the ego vehicle 100 into the accessory-power state when the operator is going to sit in but not drive the ego vehicle 100. In response to the ego vehicle 100 being in the on state, the process 700 returns to the block 705 to receive updated sensor data. In response to the ego vehicle 100 being turned to the off state or accessory-power state, the process 700 ends.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Python, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), a nonrelational database (NoSQL), a graph database (GDB), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted.

The disclosure has been described in an illustrative manner, and it is to be understood that the terminology which has been used is intended to be in the nature of words of description rather than of limitation. Use of "in response to," "upon determining," etc. indicates a causal relationship, not merely a temporal relationship. Terms such as "front," "forward," "back," "rearward," "longitudinal," "left," "right," "lateral," etc., are understood relative to the ego vehicle 100. Many modifications and variations of the present disclosure are possible in light of the above teachings, and the disclosure may be practiced otherwise than as specifically described.

What is claimed is:

1. A computer comprising a processor and a memory, the memory storing instructions executable by the processor to:

generate a potential field covering an environment surrounding an ego vehicle and centered on the ego vehicle, the potential field being a mathematical function taking a position in the environment as an argument and outputting a scalar quantity, the potential field indicating relevance to the ego vehicle;

determine a relevance score for an object in the environment by evaluating the potential field using a position of the object in the potential field as an input; and actuate a component of the ego vehicle based on the relevance score.

2. The computer of claim 1, wherein the instructions further include instructions to operate the ego vehicle based on the relevance score.

3. The computer of claim 1, wherein the instructions further include instructions to generate the potential field based on a speed at which the ego vehicle is traveling through the environment.

4. The computer of claim 3, wherein the instructions further include instructions to determine a longitudinal reference distance extending longitudinally from the ego vehicle based on the speed, and generate the potential field based on the longitudinal reference distance.

5. The computer of claim 1, wherein the instructions further include instructions to generate the potential field based on a layout of a road on which the ego vehicle is traveling.

6. The computer of claim 5, wherein the instructions further include instructions to determine a lateral reference distance extending laterally from the ego vehicle based on the layout of the road, and generate the potential field based on the lateral reference distance.

7. The computer of claim 6, wherein the lateral reference distance is a left lateral reference distance extending left from the ego vehicle, and the instructions further include instructions to determine a right lateral reference distance extending laterally right from the ego vehicle based on the layout of the road, and generate the potential field based on the left lateral distance and the right lateral reference distance, the right lateral reference distance being different than the left lateral reference distance.

8. The computer of claim 5, wherein the layout of the road includes a lane line of the road, and the instructions further include instructions to generate the potential field based on the lane line.

9. The computer of claim 5, wherein the layout of the road includes an upcoming intersection in a forward direction from the ego vehicle, and the instructions further include instructions to generate the potential field based on the upcoming intersection.

10. The computer of claim 1, wherein the instructions further include instructions to generate the potential field based on a position of a target vehicle.

11. The computer of claim 10, wherein the instructions further include instructions to determine a longitudinal reference distance extending longitudinally from the ego vehicle based on the position of the target vehicle, and generate the potential field based on the longitudinal reference distance.

12. The computer of claim 10, wherein the target vehicle is a leading vehicle traveling ahead of the ego vehicle.

13. The computer of claim 1, wherein the potential field is defined relative to a Frenet frame following a lane of travel of the ego vehicle, the Frenet frame defining position in terms of a path length along the lane of travel and a distance perpendicular to the lane of travel.

14. The computer of claim 1, wherein the potential field is continuously differentiable across the environment.

15. The computer of claim 1, wherein the instructions further include instructions to determine the relevance score for the object based on a heading of the object.

16. The computer of claim 15, wherein the instructions further include instructions to determine the relevance score based on an angle between the heading of the object and a gradient of the potential field at the position of the object.

17. A method comprising:

generating a potential field covering an environment surrounding an ego vehicle and centered on the ego vehicle, the potential field being a mathematical function taking a position in the environment as an argument and outputting a scalar quantity, the potential field indicating relevance to the ego vehicle;

determining a relevance score for an object in the environment by evaluating the potential field using a position of the object in the potential field as an input; and actuating a component of the ego vehicle based on the relevance score.

18. The method of claim 17, further comprising generating the potential field based on a speed at which the ego vehicle is traveling through the environment.

19. The method of claim 17, further comprising generating the potential field based on a layout of a road on which the ego vehicle is traveling.

20. The method of claim 17, further comprising generating the potential field based on a position of a target vehicle.

* * * * *